(12) United States Patent
Spataro et al.

(10) Patent No.: US 8,738,703 B2
(45) Date of Patent: May 27, 2014

(54) SYSTEMS AND METHODS FOR PROVIDING ONLINE COLLABORATIVE SUPPORT

(75) Inventors: Anthony Spataro, Goleta, CA (US);
Vishal Mittal, Santa Barbara, CA (US);
Shadi Muklashy, Pasadena, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1435 days.

(21) Appl. No.: 11/582,528

(22) Filed: Oct. 17, 2006

(65) Prior Publication Data

US 2008/0091829 A1 Apr. 17, 2008

(51) Int. Cl.
*G06F 15/16* (2006.01)

(52) U.S. Cl.
USPC .......................................................... 709/205

(58) Field of Classification Search
USPC .................................. 709/202–207, 223–227
See application file for complete search history.

(56) References Cited

U.S. PATENT DOCUMENTS

| | | | |
|---|---|---|---|
| 4,499,499 A | 2/1985 | Brickman et al. |
| 4,887,204 A | 12/1989 | Johnson et al. |
| 4,937,784 A | 6/1990 | Masai et al. |
| 5,014,221 A | 5/1991 | Mogul |
| 5,031,089 A | 7/1991 | Liu et al. |
| 5,175,852 A | 12/1992 | Johnson et al. |
| 5,202,971 A | 4/1993 | Henson et al. |
| 5,233,701 A | 8/1993 | Nakata et al. |
| 5,249,290 A | 9/1993 | Heizer |
| 5,325,527 A | 6/1994 | Cwikowski et al. |
| 5,329,619 A | 7/1994 | Page et al. |
| 5,341,477 A | 8/1994 | Pitkin et al. |
| 5,341,478 A | 8/1994 | Travis, Jr. et al. |
| 5,367,688 A | 11/1994 | Croll |
| 5,414,457 A | 5/1995 | Kadowaki et al. |
| 5,473,599 A | 12/1995 | Li et al. |
| 5,485,460 A | 1/1996 | Schrier et al. |
| 5,499,343 A | 3/1996 | Pettus et al. |
| 5,515,508 A | 5/1996 | Pettus et al. |
| 5,526,492 A | 6/1996 | Ishida et al. |

(Continued)

FOREIGN PATENT DOCUMENTS

| | | |
|---|---|---|
| EP | 0381645 | 8/1990 |
| EP | 0384339 | 8/1990 |

(Continued)

OTHER PUBLICATIONS

Barnes et al. "A Framework and Data Model for Centralized Conferencing: draft-ietf-xcon-framework-05.txt," IETF Standard-Working-Draft, Internet Engineering Task Force, IETF, CH, vol. xcon, No. 5, Sep. 11, 2006, 61 pages.

(Continued)

*Primary Examiner* — Krista Zele
*Assistant Examiner* — Esther Benoit
(74) *Attorney, Agent, or Firm* — McDermott Will & Emery LLP (57) ABSTRACT

A first support node and a third node provide online collaborative support to a customer node over a computer network. An online support session facilitating, at least in part, bi-directional communication between the customer node and the first support node is established. The third node is also connected to the online support session and receives support session information from the customer node. In addition, information is communicated bi-directionally between the first support node and the third node.

31 Claims, 2 Drawing Sheets

(56) References Cited

U.S. PATENT DOCUMENTS

| | | | |
|---|---|---|---|
| 5,530,852 A | 6/1996 | Meske, Jr. et al. | |
| 5,537,546 A | 7/1996 | Sauter et al. | |
| 5,548,726 A | 8/1996 | Pettus | |
| 5,553,242 A | 9/1996 | Russell et al. | |
| 5,557,732 A | 9/1996 | Thompson | |
| 5,557,748 A | 9/1996 | Norris | |
| 5,561,769 A | 10/1996 | Kumar et al. | |
| 5,572,643 A | 11/1996 | Judson | |
| 5,572,674 A | 11/1996 | Ernst | |
| 5,572,724 A | 11/1996 | Watanabe et al. | |
| 5,579,469 A | 11/1996 | Pike | |
| 5,583,992 A | 12/1996 | Kudo et al. | |
| 5,596,745 A | 1/1997 | Lai et al. | |
| 5,606,493 A | 2/1997 | Duscher et al. | |
| 5,623,656 A | 4/1997 | Lyons | |
| 5,644,720 A | 7/1997 | Boll et al. | |
| 5,657,390 A | 8/1997 | Elgamal et al. | |
| 5,680,549 A | 10/1997 | Raynak et al. | |
| 5,701,451 A | 12/1997 | Rogers et al. | |
| 5,706,437 A | 1/1998 | Kirchner et al. | |
| 5,710,918 A | 1/1998 | Lagarde et al. | |
| 5,721,876 A | 2/1998 | Yu et al. | |
| 5,734,865 A | 3/1998 | Yu | |
| 5,754,830 A | 5/1998 | Butts et al. | |
| 5,758,342 A | 5/1998 | Gregerson | |
| 5,761,507 A | 6/1998 | Govett | |
| 5,764,908 A | 6/1998 | Shoji et al. | |
| 5,764,915 A | 6/1998 | Heimsoth et al. | |
| 5,802,258 A | 9/1998 | Chen | |
| 5,802,306 A | 9/1998 | Hunt | |
| 5,812,784 A | 9/1998 | Watson et al. | |
| 5,826,027 A | 10/1998 | Pedersen et al. | |
| 5,828,840 A | 10/1998 | Cowan et al. | |
| 5,838,906 A | 11/1998 | Doyle et al. | |
| 5,838,910 A | 11/1998 | Domenikos et al. | |
| 5,838,916 A | 11/1998 | Domenikos et al. | |
| 5,918,018 A | 6/1999 | Gooderum et al. | |
| 5,938,733 A | 8/1999 | Heimsoth et al. | |
| 5,941,949 A | 8/1999 | Pedersen | |
| 5,941,988 A | 8/1999 | Bhagwat et al. | |
| 5,951,694 A | 9/1999 | Choquier et al. | |
| 5,961,586 A | 10/1999 | Pedersen | |
| 5,978,848 A | 11/1999 | Maddalozzo, Jr. et al. | |
| 6,085,247 A | 7/2000 | Parsons, Jr. et al. | |
| 6,157,944 A | 12/2000 | Pedersen | |
| 6,438,598 B1 | 8/2002 | Pedersen | |
| 6,567,813 B1 | 5/2003 | Zhu et al. | |
| 8,005,700 B2 * | 8/2011 | Amitabh et al. | 705/7.11 |
| 2002/0038388 A1 | 3/2002 | Netter | |
| 2002/0059377 A1* | 5/2002 | Bandhole et al. | 709/204 |
| 2002/0076025 A1 | 6/2002 | Liversidge et al. | |
| 2002/0123983 A1* | 9/2002 | Riley et al. | 707/1 |
| 2003/0110228 A1* | 6/2003 | Xu et al. | 709/207 |
| 2003/0167301 A1 | 9/2003 | Zhu et al. | |
| 2003/0167302 A1 | 9/2003 | Zhu et al. | |
| 2003/0167303 A1 | 9/2003 | Zhu et al. | |
| 2003/0167304 A1 | 9/2003 | Zhu et al. | |
| 2003/0167305 A1 | 9/2003 | Zhu et al. | |
| 2003/0167339 A1 | 9/2003 | Zhu et al. | |
| 2003/0167418 A1 | 9/2003 | Zhu et al. | |
| 2005/0232168 A1 | 10/2005 | Schauser et al. | |
| 2005/0235014 A1 | 10/2005 | Schauser et al. | |
| 2006/0026466 A1* | 2/2006 | Pozarycki et al. | 714/38 |
| 2007/0061468 A1* | 3/2007 | Kelly et al. | 709/227 |

FOREIGN PATENT DOCUMENTS

| | | |
|---|---|---|
| EP | 0483576 | 5/1992 |
| EP | 0540151 | 5/1993 |
| EP | 0648038 | 4/1995 |
| EP | 0732834 | 9/1996 |
| JP | 06332782 | 12/1994 |
| WO | WO-97/49030 | 12/1997 |
| WO | WO-9852320 | 11/1998 |
| WO | WO-9852344 | 11/1998 |

OTHER PUBLICATIONS

International Search Report for corresponding International Application No. PCT/US2007/021949, mailed Jul. 24, 2008, 5 pages.

Written Opinion for corresponding International Application No. PCT/US2007/021949, mailed Jul. 24, 2008, 6 pages.

Davis, Philip. "An Interactive Hypermedia Map Viewer," Database, vol. 18, No. 2, pp. 65-67, (Apr./May 1995).

The Animator Applet (1.0.2)—example 1, http://199.185.96.71/java/Animator/example.html, printed May 1, 1999.

Droms, R., "Dynamic Host Configuration Protocol", Network Working Group Request for Comments: 1541, Oct. 1993, pp. 1-39.

"OS/2 EE Database Manager SQLJRA Remote Protocol", IBM Technical Disclosure Bulletin, vol. 36, No. 1, Jan. 1993, pp. 33-36.

"Allocation of Equivalent Communication Buffer Sizes in SQLJRA Remote Protocol", IBM Technical Disclosure Bulletin, vol. 36, No. 1, Jan. 1993, pp. 29-31.

Mann, Bruce E. et al., "Terminal Servers on Ethernet Local Area Networks", Digital Technical Journal, No. 3, Sep. 1986, pp. 73-87.

Windows NT Networking Guide: Microsoft Windows NT Resource Kit, Microsoft Press 1995, pp. 79-87.

Schemers, R.J., Update, Sep. 17, 1995, pp. 1-5.

Adler, Richard M., "Distributed Coordination Models for Client/Server Computing," Apr. 1995 Computer Magazine, pp. 14-22.

Administering Remote Assistance [online], [retrieved on Oct. 13, 2006]. Retrieved from the Internet <URL: http://www.microsoft.com/technet/prodtechnol/winxppro/maintain/adminra.mspx>.

Chu, Josey M. et al., "Creating a Hypertext Markup Language Documents for an Information Server," *Behavior Research Methods, Instrucments & Computers*, vol. 27, No. 2, pp. 200-205, (Jan. 1, 1995).

Holtzman, Jeff. "Merge 386: Run Unix and DOS together on an 80386," Byte, pp. 207-208, 211-212, (Dec. 1998).

Kaiser, John. Step-by-Step Guide to Remote Assistantce [online], [retrieved on Oct. 13, 2006]. Retrieved from the Internet <URL: http://www.microsoft.com/technet/prodtechnol/winxppro/maintain/rmassist.mspx>.

Putz, Steve. "Interactive Information Services Using World-Wide Web Hypertext," *Computer Networks and ISDN Systems*, Elsevier Science B.V., vol. 27, pp. 273-280, (1994).

Saharon, Yossi. Professor Windows—Oct. 2002. eXPeriencing Remote Assistance [online], [retrieved on Oct. 13, 2006]. Retrieved from the Internet <URL: http://www.microsoft.com/technet/community/columns/profwin/pw1002.mspx>.

Singleton, A.; Byte; "Wired on the Web"; (Jan. 1, 1996), pp. 77-78, 80.

Tanenbaum, Andrew S., *Computer Networks*, Second Edition, Chapter 6 "Networking in Unix," pp. 434-435, Prentice Hall P T R, Englewood Cliffs, New Jersey.

Tessier, Tom "Using Javascript to Create Interactive Web Pages: A Cross-Platform Object Scripting Language," *Dr. Dobb's Journal*, vol. 21, No. 3, pp. 84-97, (Mar. 1996).

van Hoff, Arthur. "Java and Internet Programming," *Dr. Dobb's Journal*, pp. 56, 58, 60-61, 101-102, (Aug. 1995).

Office Action dated Sep. 27, 2012 from Corresponding European Patent Application No. 07839543.1.

* cited by examiner

SYSTEMS AND METHODS FOR PROVIDING ONLINE COLLABORATIVE SUPPORT

TECHNICAL FIELD

The invention generally relates to communications over a computer network. More particularly, the invention relates to systems and methods for providing online collaborative support.

BACKGROUND

Users of computers and computer software programs often require technical support. For example, amongst other needs, they may require help installing, and/or navigating through the many features offered by, an operating system or an application program. Technical support organizations exist to support and aid those users. For example, the user manual or other materials distributed with a computer program may include a telephone number that the recipient and/or user of the program can call for assistance.

Typically, modern support providers minimize the cost of labor by hiring a large pool of "bottom tier" personnel who have limited expertise. Such personnel often interact, in the first instance, with the customer seeking assistance, solve trivial issues, and escalate non-trivial issues to a higher "second tier" of more knowledgeable or more specialized personnel. These more knowledgeable or specialized personnel may in turn escalate issues beyond their knowledge or capabilities to a higher "third tier" of even more knowledgeable or more specialized personnel. The "third tier" may in turn escalate to a "fourth tier," the "fourth tier" to a "fifth tier," and so on.

Each time an issue is escalated, a laborious, time-consuming, and inefficient process ensues whereby the lower-tier representative contacts a higher-tier representative, introduces the customer, conveys the issue, and "hands off" the customer to the higher-tier representative. Often, though, all representatives at the higher-tier will be busy and the customer told to wait and hold, or even to call back at another time. Unsurprisingly, many computer customers are unsatisfied with the services provided by modern support organizations and may even be reluctant to call such organizations for assistance.

In addition, modern support providers often fail, or do not have the infrastructure, to monitor the communications exchanged between their support personnel and the customers seeking assistance. Accordingly, no mechanism exists for improving the level of service provided to the customer or for enhancing the customer's experience with the support provider.

Thus, needs clearly exist for improving the current level of services offered by modern technical support organizations and for overseeing the personnel providing such services.

SUMMARY OF THE INVENTION

The present invention relates to systems and methods for providing online collaborative support and for monitoring online communications. More specifically, embodiments of the present invention enable various modes of real-time collaboration between two or more customer-support representatives, such as, for example, support representatives at different "tiers" of knowledge, expertise, and/or specialization. The laborious and sometimes annoying process of "handing off" a customer to a support representative at a higher-tier of knowledge and/or specialization may be eliminated from the customer experience, and replaced by a method for seamlessly providing collaborative support to the customer. Depending on the mode of operation of the invention, the customer may or may not be aware that collaboration is in fact occurring. For example, in various embodiments of the invention, collaboration occurs among support representatives at different tiers of knowledge and/or specialization, but the customer perceives that he or she is interacting with only one support representative who appears to the customer to be very knowledgeable and specialized.

In other embodiments of the invention, a supervisor or manager for the technical support organization may oversee and monitor the collaboration occurring between the various customer support representatives and the information relayed to and received from the customer seeking aid. By observing such interactions, the supervisor or manager is empowered to improve the level of service provided to the customer by, for example, offering feedback to the support personnel, changing the manner in which aid is dispensed to the customer or in which interactions occur between the support personnel, correcting mistakes going forward, or through other measures.

In general, in one aspect, the invention features a method of providing online collaborative support to a customer node over a computer network. More specifically, an online support session facilitating, at least in part, bi-directional communication between a customer node and a first support node is established, a third node is connected to the online support session, the third node receives support session information from the customer node, and information is communicated bi-directionally between the first support node and the third node.

In general, in another aspect, the invention features a system for providing online collaborative support to a customer node over a computer network. The system includes a first support node and a third node. The first support node is configured to connect to an online support session with a customer node and to bi-directionally communicate with the customer node, while the third node is configured to connect to the online support session, to receive support session information from the customer node, and to bi-directionally communicate with the first support node.

In various embodiments of these aspects of the invention, the third node may be, for example, a support node that is visible to the customer node, a support node that is hidden or cloaked from the customer node, or a supervisory or managerial node that monitors communications occurring between the customer node and the first support node. In addition, the methods of the invention may employ, and the systems of the invention may include, the customer node and a node intermediate to the customer node and the third node.

In one embodiment, the first support node provides session co-ordinates for the online support session to the third node to facilitate connection of the third node to the online support session. This may occur where, for example, a customer-support representative located at the first support node desires to escalate issues beyond his or her knowledge or capability to a more knowledgeable or specialized customer-support representative located at the third node. The third node may then be connected to the online support session using the session co-ordinates. Where, for example, the third node is a visible support node, the customer node may be notified, by the intermediate node for example, of the connection from the third node to the online support session. Alternatively, where, for example, the third node is a cloaked support node, the third node may be connected to the online support session without notice thereof to the customer node.

In another embodiment, information is transmitted from the third node to the customer node. This information may appear to the customer node to have been transmitted from the first support node (e.g., the third node is cloaked or hidden from the customer node). Alternatively, the customer node may distinguish between the information transmitted from the first support node and the information transmitted from the third node (e.g., the third node is visible to the customer node). In addition, in one embodiment, the customer node processes information transmitted thereto.

In one embodiment, the third node is assigned a control privilege over the first support node and the customer node gives priority to processing the information transmitted from the third node. In one example of this embodiment, both the first support node and the third node are permitted to interact with the customer node by transmitting commands to the customer node's processor, but the third node is assigned higher privileges than the first node and is therefore given priority over the first node in having its commands executed by the customer node's processor. Alternatively, in another embodiment, priority may simply be accorded to the node that first transmits the information. For example, both the first support node and the third node may be given a fair chance to control the customer node, and the first to send commands to the customer node's processor is permitted to do so. It should be stressed that modes of operation can change during a session. For example, a supervisor initially observing an exchange in a hidden or cloaked fashion may decide, upon detecting customer frustration, to explicitly join the session. In this way, the supervisor can provide not only further support, but also reassurance to the customer that a superior is monitoring support interactions.

In yet another embodiment, the intermediate node (which may be, for example, a communication server) receives the support session information from the customer node and transmits this information to the third node. The customer node may transmit the support session information to the intermediate node without knowledge that the support session information will then be transmitted to the third node (e.g., the third node is cloaked from the customer node). Alternatively, the customer node may have knowledge that the support session information will be transmitted to the third node (e.g., the third node is visible to the customer node).

As mentioned, the first support node and the third node may communicate information bi-directionally between themselves. The customer-support representatives located at those nodes may, for example, discuss the customer node's support issue amongst themselves, or the customer-support representative located at the third node may give the customer-support representative located at the first node instructions on how to resolve the customer node's support issue. The information communicated between the first support node and the third node may be exchanged with or without notice thereof to the customer node.

In a further embodiment, a fourth node is connected to the online support session. More particularly, session co-ordinates for the online support session may be provided to the fourth node (for example from a customer-support representative at the third node once he or she desires to escalate issues beyond his or her knowledge or capability to a more knowledgeable or specialized customer-support representative located at the fourth node) and the fourth node may be connected to the online support session using the received session co-ordinates.

In various embodiments, once the fourth node is connected to the online support session, the fourth node may receive support session information from the customer node and may transmit information in return to the customer node. The information transmitted from the fourth node to the customer node may be directly transmitted from the fourth node to the customer node (e.g., the fourth node may be visible to the customer node), or the information may be transmitted from the fourth node to the customer node by way of the third node and/or the first support node (e.g., the fourth node may be cloaked from the customer node). In addition, the first support node, the third node, and the fourth node may communicate information amongst themselves. Naturally, these modes of operation can be extended to encompass additional nodes as desired.

In another embodiment, the fourth node is, for example, a supervisory or managerial node that selects the online support session to which it desires to connect. The fourth node may then monitor information communicated between the customer node and the first support node without notice of that monitoring being provided to the customer node or to the first support node. In particular, in one embodiment, the fourth node is connected to the online support session without notice of that connection being provided to the customer node or to the first support node. In addition, in its supervisory or managerial role, the fourth node may monitor information communicated between the first support node and one or more additional support nodes without notice, and may explicitly join the online support session as the supervisor or manager deems appropriate.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DESCRIPTION

In general, the present invention pertains to systems and methods for providing online collaborative support and for monitoring online communications. In broad overview, in accordance with one aspect of the invention, a first computing device, for example a customer node, communicates with a second computing device, for example a first support node, over a computer network. In one embodiment, the customer node seeks technical support with, for example, installing, and/or navigating through the many features offered by, an operating system or an application program. Thus, an online support session facilitating bi-directional communication between the customer node and the first support node is established. A third computing device, or node, may also be connected to the online support session and receive support session information from the customer node. The third node may, for example, collaborate with the first support node to provide collaborative support to the customer node. Alternatively, the third node or any additional node (e.g., a fourth node, a fifth node, etc.) may monitor or supervise, without notice, the communications occurring between the customer node and the first support node.

Figure 1:
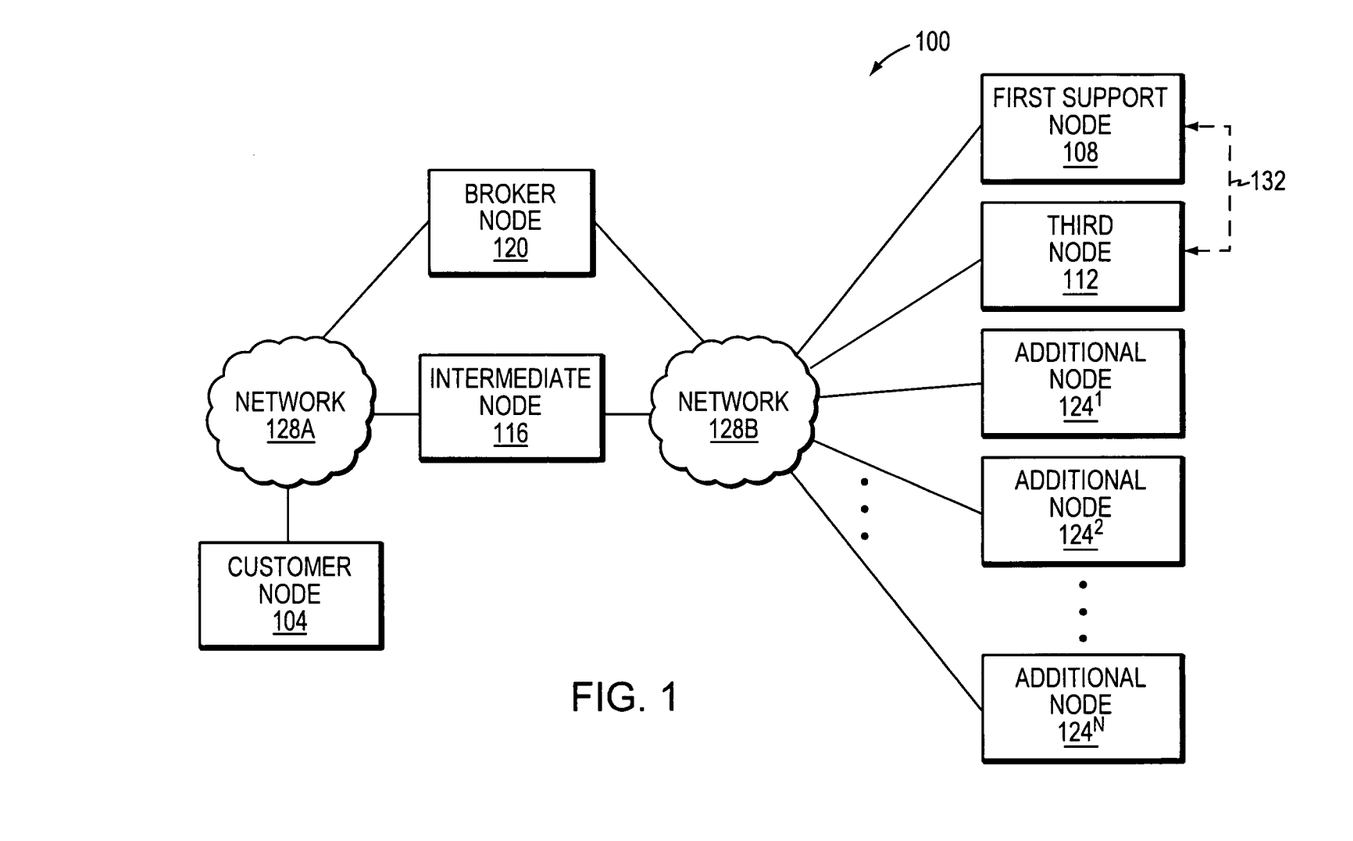
FIG. 1 is a block diagram of an illustrative embodiment of a system for providing online collaborative support to a customer node over a computer network in accordance with the invention.

FIG. 1 depicts a system 100 for providing online collaborative support to the customer node over a computer network according to an illustrative embodiment of this aspect of the invention. The system 100 includes a customer node 104, a first support node 108, and a third node 112. In addition, the system 100 may optionally include an intermediate node 116, a broker node 120, one or more additional nodes $124^1$-$124^N$, and networks 128A, 128B. The networks 128A and 128B may be separate networks, or they may in fact be the same network. Additional networks may also be present to facilitate the communication between the nodes illustrated in FIG. 1.

Either or both networks 128A and 128B may be, for example, a local-area network (LAN), such as a company Intranet, a metropolitan area network (MAN), or a wide area network (WAN), such as the Internet. The various nodes illustrated in FIG. 1 may be connected to the networks 128A and/or 128B through a variety of connections including, but not limited to, standard telephone lines, LAN or WAN links (e.g., T1, T3, 56 kb, X.25), broadband connections (e.g., ISDN, Frame Relay, ATM), or wireless connections. The connections, moreover, may be established using a variety of communication protocols (e.g., HTTP, TCP/IP, IPX, SPX, NetBIOS, NetBEUI, SMB, Ethernet, ARCNET, Fiber Distributed Data Interface (FDDI), RS232, IEEE 802.11, IEEE 802.11a, IEEE 802.11b, IEEE 802.11g, and direct asynchronous connections).

The customer node 104, first support node 108, third node 112, and additional nodes $124^1$-$124^N$ may each be any type of personal computer, Windows-based terminal, network computer, wireless device, information appliance, RISC Power PC, X-device, workstation, mini computer, main frame computer, personal digital assistant, set top box, handheld device, or other computing device that is capable of both presenting information/data to, and receiving commands from, a user of the node 104, 108, 112, or $124^1$-$124^N$. For example, one or more of the customer node 104, first support node 108, third node 112, and additional nodes $124^1$-$124^N$ may include a visual display device (e.g., a computer monitor), a data entry device (e.g., a keyboard), persistent and/or volatile storage (e.g., computer memory), a processor, and a mouse. In one embodiment, the nodes 104, 108, 112, and $124^1$-$124^N$ each include a web browser, such as, for example, the INTERNET EXPLORER program developed by Microsoft Corporation of Redmond, Wash., to connect to the World Wide Web.

Each of the intermediate node 116 and the broker node 120 may be any computing device capable of receiving information/data from, and delivering information/data to, the various nodes 104, 108, 112, and $124^1$-$124^N$ illustrated in FIG. 1, for example over the networks 128A and 128B. For example, the intermediate node 116 may be a communication server that facilitates the communication of information over the networks 128A, 128B between the customer node 104 and one or more of the first support node 108, the third node 112, and the additional nodes $124^1$-$124^N$, and vice-versa. For its part, the broker node 120 may facilitate the connection of the customer node 104, the first support node 108, the third node 112, and the additional nodes $124^1$-$124^N$ to the intermediate node 116 by, for example, initially identifying the intermediate node 116 as the node to which they should connect and providing the passwords, security information, and/or other identifying information necessary to establish those connections.

Figure 2:
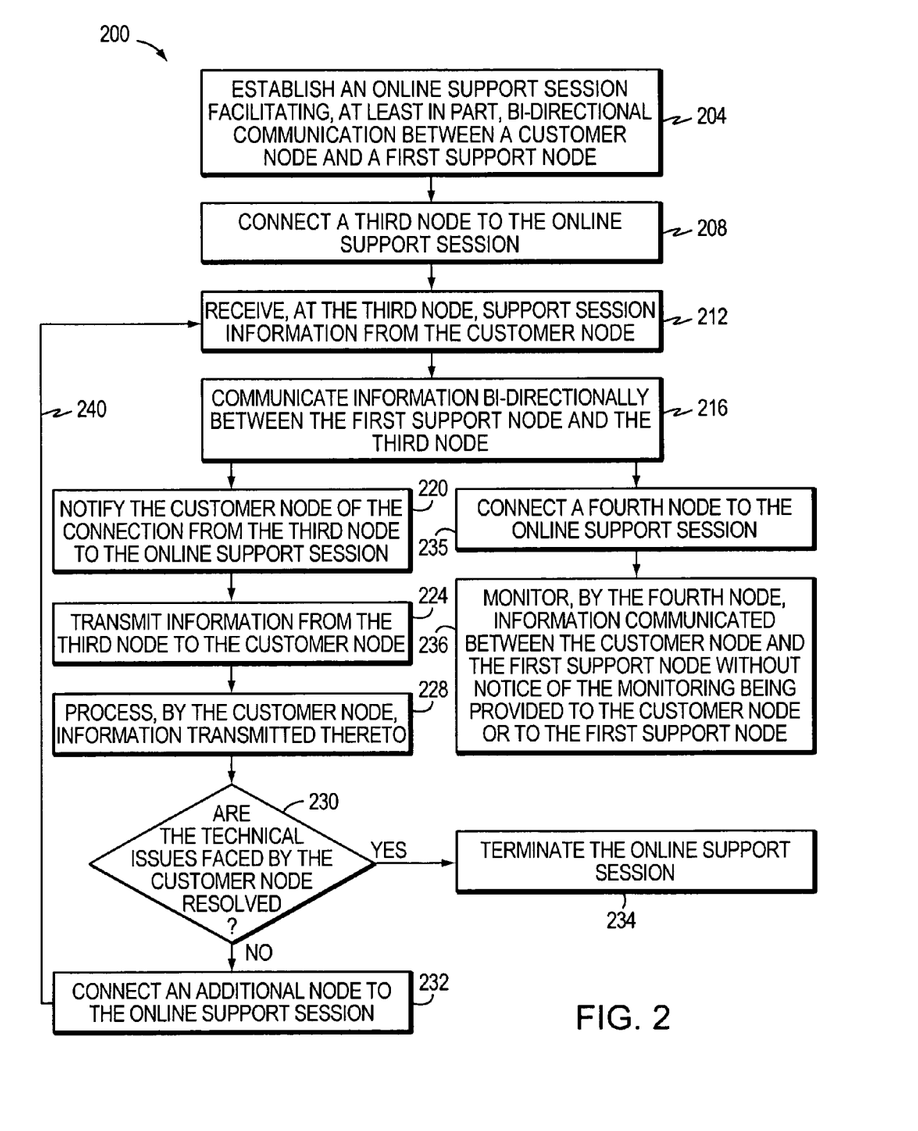
FIG. 2 is a flow diagram of an illustrative embodiment of a method for providing online collaborative support to a customer node over a computer network in accordance with the invention.

As explained herein, the first support node 108 may be operated by a support representative at a first or bottom tier of knowledge, experience, and/or specialization. In one embodiment, the third node 112 is also a support node, but is operated by a support representative at a second tier who has greater knowledge, experience, and/or specialization than a support representative at the first or bottom tier. Similarly, the additional nodes $124^1$-$124^N$ may also be support nodes with the additional node $124^1$ being operated by a support representative at a third tier who has greater knowledge, experience, and/or specialization than a support representative at the second tier, and the additional node $124^N$ being operated by a support representative at a higher-tier (and having greater knowledge, experience, and/or specialization) than a support representative that is operating the additional node $124^{N-1}$. As described below with reference to the method 200, the nodes 108, 112, and $124^1$-$124^N$ may collaborate to resolve technical issues faced by the customer node 104. As also described below, a fourth node $124^1$ (or another node in the system 100) may operate as a supervisory or managerial node, as opposed to a support node.

It will be understood by those skilled in the art that FIG. 1 is a simplified illustration of the system 100 and that it is depicted as such to facilitate the explanation of the present invention. For example, more than one customer node 104, more than one intermediate node 116, more than one first support node 108, and more than one third node 112 may be present in the system 100. Moreover, in accordance with the invention, the first support node 108 may provide technical support to two customer nodes 104 at once, the third node 112 may oversee, and participate in the provision of technical support to, four to ten customer nodes 104 at once (i.e., the third node may interact with two to five first support nodes 108 at once), the additional node $124^1$ may oversee, and participate in the provision of technical support to, eight to 50 customer nodes 104 at once (i.e., the additional node $124^1$ may interact with two to five third nodes 112 at once), and so on. In addition, the system 100 need not necessarily include an intermediate node 116 or the broker node 120. For example, the customer node 104 could instead communicate over only a network 128A or 128B with one or more of the first support node 108, the third node 112, and the additional nodes $124^1$-$124^N$. As such, the depiction of the system 100 in FIG. 1 is non-limiting.

With reference now to FIG. 2, in one embodiment of a method 200 for providing online collaborative support to a customer node over a computer network, for example using the system 100 of FIG. 1, an online support session facilitating, at least in part, bi-directional communication between the customer node 104 and the first support node 108 is established at step 204, the third node 112 is connected to the online support session at step 208, support session information is received from the customer node 104 at the third node 112 at step 212, and information is communicated bi-directionally between the first support node 108 and the third node 112 at step 216. Optionally, the method 200 may also include notifying the customer node 104 of the connection from the third node 112 to the online support session (step 220), transmitting information from the third node 112 to the customer node 104 (step 224), and processing, by the customer node 104, the information transmitted thereto (step 228). In addition, the method 200 may optionally include connecting one of the additional nodes $124^1$-$124^N$ to the online support session (step 232) and thereafter repeating steps 212-228 with that additional node present in the system 100. Eventually, a "YES" answer is provided to the query of step 230 (i.e., the technical issue faced by the customer node 104 is resolved) and the online support session is terminated at step 234. The method 200 may also optionally include connecting a fourth node (e.g., additional node $124^1$) to the online support session (step 235) and monitoring, by the fourth node $124^1$, information communicated between the customer node 104 and the first support node 108, without notice of that monitoring being provided to either the customer node 104 or the first support node 112 (step 236).

In greater detail, and with reference to FIGS. 1 and 2, an online support session facilitating, at least in part, bi-directional communication between the customer node 104 and the first support node 108 is established at step 204. In one embodiment, the first support node 108 polls the broker node 120 to determine whether a customer node 104 is requesting support for a technical issue that it is facing. If not, the first support node 108 may continue to poll the broker node 120 (for example, every 15 seconds or another period of time) to make the same determination, until a customer node 104 does in fact request support from the system 100. When faced with a technical support issue, the customer node 104 may transmit a message to the broker node 120 indicating that it requires assistance. The broker node 120 may then transmit separate messages to both the customer node 104 and the first support node 108, providing each of them with session co-ordinates for an online support session. The session co-ordinates may indicate, for example, the intermediate node 116 to which the customer node 104 and the first support node 108 are to connect, and may include identification/password information for establishing their respective connections to the intermediate node 116.

Once authenticated by the intermediate node 116, the first support node 108 and the customer node 104 are each connected to an online support session with one another and may bi-directionally communicate with one another. For example, in an effort to resolve the technical issue(s) faced by the customer node 104, the first support node 108 and the customer node 104 may chat with one another (via text or audio) and exchange data (e.g., files), and the first support node 108 may view the visual display device (e.g., screen) of the customer node 104, control the mouse and/or keyboard commands processed by the processor of the customer node 104, view XML diagnostic information contained in structured XML documents exchanged with the customer node 104, and send support files to the customer node 104. Any one of such exemplary communications, commands, documents, files, and/or data that are exchanged for purposes related to the resolution of the technical issue(s) faced by the computer node 104 are more generally referred to herein as "support session information." Moreover, one exemplary manner in which the first support node 108 may view the visual display device (e.g., screen) of the customer node 104 is by employing a "screen sharing" method of the type described in, for example, commonly-owned U.S. patent application Ser. No. 10/709,141 entitled "Methods and Apparatus for Sharing Graphical Screen Data in a Bandwidth-Adaptive Manner," the disclosure of which is hereby incorporated herein by reference in its entirety.

At step 208, the third node 112 connects to the online support session. In one embodiment, the third node 112 is also a support node and collaborates with the first support node 108 in an effort to resolve the technical issue(s) faced by the customer node 104. In one such case, prior to the third node 112 connecting to the online support session, the support representative operating the first support node 108 determines that the technical issue(s) faced by the customer node 104 are beyond his or her knowledge, experience, and/or specialization and, therefore, he or she invites the support representative operating the third node 112 to join the online support session. For example, the first support node 108 may provide session co-ordinates for the online support session to the third node 112, and the third node 112 may use the session co-ordinates to connect to the online support session. As before, the session co-ordinates may include an identification of the intermediate node 116 hosting the online support session and identification/password information that will allow the intermediate node 116 to authenticate the third node 112 and connect the third node 112 to the online support session. As another example, rather than providing session co-ordinates for the online support session to the third node 112 and connecting the third node 112 to the intermediate node 116, the first support node 108 and the third node 112 may establish a separate connection 132 between themselves (illustrated in phantom in FIG. 1). The separate connection 132 may use a different communication protocol than the protocol used to communicate information/data over the connection existing between the first support node 108 and the customer node 104, and/or may be over a different network than the networks 128A, 128B supporting the connection between the first support node 108 and the customer node 104. In this second example, the first support node 108 may relay to the third node 112 any information transmitted to, or received from, the customer node 104. In either example, however, the third node 112 is connected to the online support session.

At step 212, the third node 112 receives support session information from the customer node 104. The support session information received from the customer node 104 at the third node 112 may be received through (i.e., from) the intermediate node 116. For example, the customer node 104 may transmit the support session information to the intermediate node 116 and the intermediate node 116 may in turn transmit such information to the first support node 108 and/or the third node 112. Moreover, where the third node 112 is hidden or cloaked from the customer node 104 (as explained below), the customer node 104 may transmit the support session information to the intermediate node 116 without knowledge that the support session information will then be transmitted by the intermediate node 116 to the third node 112. Again, one exemplary manner in which the third node 112 may view the visual display device (e.g., screen) of the customer node 104 is by employing a "screen sharing" method of the type described in, for example, the '141 application mentioned above. In another embodiment, as discussed above, the support session information received from the customer node 104 at the third node 112 is received through (i.e., from) the first support node 108.

In one embodiment of the invention, the third node 112 is a support node that is visible to the customer node 104. Alternatively, in another embodiment of the invention, the third node 112 is a support node that is hidden or cloaked from the customer node 104. Regardless of whether the third node 112 is visible to, or cloaked from, the customer node 104, information may be communicated bi-directionally between the third node 112 and the first support node 108 at step 216. Where the third node 112 is visible to the customer node 104, the communications that occur between the third node 112 and the first support node 108 may also be visible to the customer node 104. Where the third node 112 is cloaked from the customer node 104, however, the communications that occur between the third node 112 and the first support node 108 are not visible to the customer node 104. Rather, in this latter case, information is communicated bi-directionally between the first support node 108 and the third node 112 without transmission to the customer node 104.

In greater detail, the third node 112 and the first support node 108 may collaborate at step 216 in an effort to resolve the technical issue(s) faced by the customer node 104. Typically, the support representative operating the third node 112 has greater knowledge, experience, and/or specialization than the support representative operating the first support node 108. Accordingly, the third node 112 may field questions from the first support node 108 (and/or from the customer node 104) and provide answers, or suggestions, to the first support node 108 for resolving the technical issue(s) faced by the customer node 104. For example, the first support node 108 and the third node 112 may chat with one another (via text or audio) and exchange data (e.g., diagnostic files, support files, etc.). In one particular embodiment, the first support node 108 and the third node 112 communicate with one another using instant messaging style communications.

Where the third node 112 is a support node, steps 220, 224, 228, 230, 232, and 234 may optionally be performed in the method 200 following step 216. More specifically, where the third node 112 is a support node that is visible to the customer node 104, the customer node 104 may be notified, at step 220, of the connection from the third node 112 to the online support session. For example, the intermediate node 116 may notify the customer node 104 of the connection from the third node 112 to the online support session, and the visual display device of the customer node 104 may thereafter indicate the presence of the third node 112. Moreover, the third node 112 and the customer node 104 may be able to communicate directly with one another in an effort to resolve the technical issue(s) faced by the customer node 104. Alternatively, where the third node 112 is a support node that is hidden or cloaked from the customer node 104, the third node 112 connects to the online support session without notice thereof to the customer node 104, and step 220 of the method 200 is not performed. Accordingly, in this latter embodiment, the visual display device of the customer node 104 does not indicate the presence of the third node 112, and the third node 112 does not communicate directly with the customer node 104 in resolving the technical issue(s) faced by the customer node 104.

At step 224, the third node 112 transmits information to the customer node 104 in an effort to resolve the technical issue(s) faced by the customer node 104. Where the third node 112 is visible to the customer node 104, such information may be communicated by the third node 112 directly to the customer node 104. Alternatively, in the embodiment where the third node 112 is cloaked from the customer node 104, the information transmitted from the third node 112 to the customer node 104 appears to the customer node 104 to have been transmitted from the first support node 108. For example, in one embodiment, the third node 112 instructs the first support node 108 to pass certain specific instructions along to the customer node 104; the first support node 108 then does so, and it therefore appears to the customer node 104 that such instructions are originating from the first support node 108. As another example, the intermediate node 116 may re-configure all instructions directed by the third node 112 to the customer node 104 so that they appear to the customer node 104 to be originating from the first support node 108. In such a fashion, the support representative operating the first support node 108 appears to the customer node 104 to be more knowledgeable, experienced, and/or specialized than he really is (i.e., the support representative operating the first support node 108 appears to the customer node 104 to have the knowledge, experience, and/or specialization of the higher-tier support representative operating the third node 112). Accordingly, the user operating the customer node 104 is more likely to be satisfied with the technical support and feedback he is receiving, as it appears to him that he is receiving all such support and feedback from the first support node 108 and he is spared the need to sit through the sometimes painfully lengthy handoff process to a higher-tier support representative (i.e., the support representative operating the third node 112).

At step 228, the customer node 104 processes the information that it is transmitted. For example, the customer node 104 processes the instructions it receives in an effort to alleviate or work around the technical issue(s) it faces. Where the third node 112 is visible to the customer node 104, the customer node 104 may distinguish between the information that it is transmitted from the first support node 108 and the information that it is transmitted from the third node 112. In addition, the customer node 104 may employ different mechanisms to give priority to processing certain information it receives over other information it receives from nodes over the networks 128A, 128B. For example, because the support representative located at the third node 112 is assumed to have greater knowledge, experience, and/or specialization than the support representative located at the first support node 108, the third node 112 may be assigned a control privilege over the first support node 108. The control privilege may be determined and assigned by the customer node 104, by the intermediate node 116, by negotiation and agreement between the first support node 108 and the third node 112, or by any other node present in the system 100. In one embodiment where the third node 112 is assigned a control privilege over the first support node 108, the customer node 104 gives priority to processing the information that it is transmitted from the third node 112 over the information that it is transmitted from the first support node 108. For example, the third node 112 may take control over the customer node 104's visual display device from the first support node 108 at any time. In one example of this embodiment, however, the customer node 104 is always given the highest control privilege and may resume control over its visual display device from any other node with which it communicates over the networks 128A, 128B.

Alternatively, in another embodiment, the customer node 104 gives priority to processing the information that it is first transmitted from either the first support node 108 or the third node 112. For example, a "fair game" procedure may determine which of the first support node 108 and third node 112 is given control over the visual display device of the customer node 104. In one such procedure, the first of the first support node 108 and the third node 112 to attempt to take control of the visual display device of the customer node 104 is allowed to do so, and that node maintains control of the visual display device until it stops rendering commands to the customer node 104 for a pre-determined period of time (e.g., 1.5 seconds or another period of time), at which point it is again a "fair game" for obtaining control of the customer node's visual display device. As with the previous embodiment, the customer node 104 may be configured to resume control, at any time and without having to participate in the fair game, over its visual display device from any other node with which it communicates over the networks 128A, 128B.

After a certain period of time, the technical issue(s) faced by the customer node 104 are either resolved (i.e., a "YES" answer is provided at step 230 and the online support session is terminated at step 234) or they are not and the support representative operating the third node 112 determines that the technical issue(s) faced by the customer node 104 are beyond his or her knowledge, experience, and/or specialization (i.e., a "NO" answer is provided at step 230 and the method 200 proceeds to step 232). In the latter case, the third node 112 may request the advice or services of an additional node 124[1] (i.e., a higher-tier support representative having even greater knowledge, experience, and/or specialization) to aid in resolving the technical issue(s) faced by the customer node 104. For example, the third node 112 may provide the session co-ordinates for the online support session to the additional node 124$^1$ and the additional node 124$^1$ may be connected, at step 232, to the online support session using the session co-ordinates, as described above for the third node 112 with respect to step 208 of the method 200. Again, as another example, rather than providing session co-ordinates for the online support session to the additional node 124$^1$ and connecting the additional node 124$^1$ to the intermediate node 116, a separate connection (similar to the connection 132 between the first support node 108 and the third node 112) may be established between the additional node 124$^1$ and the third node 112 or between the additional node 124$^1$ and the first support node 108 (neither of which is shown in FIG. 1). The third node 112, or the first support node 108, may then relay to the additional node 1241 any information transmitted to, or received from, the customer node 104. As before, in either example, the additional node 124$^1$ is connected to the online support session. Thus, as used herein, the phrase "connecting to an online support session" is intended to broadly cover any form of partaking in the session, including instances in which an additional node actually joins the session as a participant (e.g., via intermediate node 116) or instead joins the session through communication with one of the session participants (e.g., the first support node 108 or a higher-tier node).

Once the additional node 124$^1$ is connected to the online support session, the additional node 124$^1$, the third node 112, and the first support node 108 may collaborate to resolve the technical issue(s) faced by the customer node 104. Specifically, as indicated by feedback arrow 240, steps 212, 216, 220, 224, and 228 of the method 200 may be again performed with the additional node 124$^1$ connected to the online support session. Accordingly, in addition to what was described above and in a similar manner to what was described above for the third node 112, the additional node 124$^1$ may receive support session information from the customer node 104 (step 212), information may be communicated among the first support node 108, the third node 112, and the additional node 124$^1$ (step 216), the additional node 124$^1$ may transmit information (either directly or indirectly) to the customer node 104 (step 224), and the customer node 104 may process the information it is transmitted from either the first support node 108, the third node 112, or the additional node 124$^1$(step 228). In addition, as was described for the third node 112, the additional node 124$^1$ may be either visible to or cloaked from the customer node 104 (meaning that step 220 of the method 200 is either performed or not, respectively, once the additional node 124$^1$ is connected to the online support session).

Once step 230 of the method 200 is again reached, the technical issue(s) faced by the customer node 104 are either resolved (meaning that the method 200 advances to step 234), or they are not and the support representative operating the additional node 124$^1$ determines that the technical issue(s) are beyond his or her knowledge, experience, and/or specialization and proceeds to request the advice and/or services of an even higher-tier support representative having even greater knowledge, experience, and/or specialization (i.e., an additional node 124$^2$) to aid in resolving the technical issue(s). In other words, step 232 of the method 200 is again entered, the additional node 124$^2$ is connected to the online support session, and steps 212, 216, 220, 224, and 228 of the method 200 are again repeated. One skilled in the art will understand that this repetitive pattern of escalating the technical issue(s) faced by the customer node 104 may be repeated until the "Nth" additional node 124$^N$ is finally able to resolve the technical issue(s) faced by the customer node 104 and the online support session is terminated at step 234.

Of course, other criteria may determine when an additional node 124$^1$-124$^N$ joins the online support session. For example, a supervisory or managerial node (described below) may be connected to the session if its monitoring time exceeds a pre-determined time threshold, if customer frustration is detected using known, automated analysis techniques (implemented on the first support node 108 or the intermediate node 116, for example), or if the need for more specialized personnel is recognized through ongoing, automated monitoring of the session dialog.

As stated above, the method 200 may also optionally include connecting a fourth node (e.g., additional node 124$^1$) to the online support session (step 235) and monitoring the information that is communicated between the customer node 104 and the first support node 108 (step 236). In addition, the fourth node 124$^1$ may even monitor any information that is communicated between the customer node 104 and the third node 108. For example, the fourth node 124$^1$ may monitor the information that is communicated between the customer node 104 and the first support node 108, and/or between the customer node 104 and the third node 112, without notice of that monitoring being provided to either the customer node 104, the first support node 108, or the third node 112. In other words, the fourth node 124$^1$ is hidden, or cloaked, from each of the customer node 104, the first support node 108, and the third node 112. In one such embodiment, the fourth node 124$^1$ is a managerial or supervisory node. Although not explicitly shown in FIG. 2, in yet another embodiment where the fourth node 124$^1$ is a supervisory or managerial node, the fourth node 124$^1$ may monitor the various nodes in the system 100 that are collaborating to resolve the technical issue(s) faced by the customer node 104. For example, the fourth node 124$^1$ may monitor the information communicated between the first support node 108, the third node 112, and any additional nodes 124$^2$-124$^N$ that are also functioning as support nodes, without notice of that monitoring being provided to either the first support node 112, to the third node 112, or to those one or more additional support nodes 124$^2$-124$^N$.

In these embodiments where the fourth node 124$^1$ acts in a supervisory or managerial role, the supervisor or manager operating the fourth node 124$^1$ may be provided at step 235, for example via the visual display device of the fourth node 124$^1$, with a summary of all of the support representatives he or she oversees. The summary may list, for example, all active online support sessions in the system 100 involving the support representatives for whom the manager or supervisor is responsible. The summary may also identify, for each of those active online support sessions, the corresponding intermediate node 116 hosting that online support session (where more than one intermediate node 116 is employed in hosting the multiple support sessions) and the support nodes in the system 100 that are participating in that online support session. The supervisor or manager may then employ the fourth node 124$^1$ to select the online support session to which he or she desires to connect. For example, the fourth node 124$^1$ may obtain the appropriate session co-ordinates from the broker node 112 and use those session co-ordinates to connect to the online support session at step 235. In one such embodiment, the fourth node 124$^1$ is connected to the online support session without notice of that connection being provided to the customer node 104, to the first support node 108, to the third node 112, or to any additional support nodes 124$^2$-124$^N$ who are active in the online support session.

Once connected to the online support session at step 235 as a supervisory or managerial node, the fourth node 124$^1$ is able to receive all support session information exchanged between the nodes participating in the online support session, including any private chat that is exchanged between the first support node 108, the third node 112, and the additional support nodes 124²-124$^N$, chat that is exchanged with the customer node 104, representations of what is being displayed by the visual display devices of the customer node 108, the first support node 108, the third node 112, and any additional support nodes 124²-124$^N$, as well as other support session information. Thus, by observing the collaboration that occurs between the various nodes participating in the support session, the supervisor or manager is empowered to improve the level of service that is provided to the customer node 104. For example, the supervisor or manager may offer feedback to the support personnel, change the manner in which aid is dispensed to the customer node 104 or in which interactions occur between the support personnel, correct mistakes going forward, and take other measures. Moreover, it should be noted that in some embodiments more than one supervisory or managerial node may monitor the online communications.

Accordingly, in addition to other advantages, the present invention is capable of providing both a consistent customer experience and the seamless escalation of one or more technical support issues faced by the customer node 104 to higher-tier support personnel. More specifically, where all support nodes other than the first support node 108 are hidden or cloaked from the customer node 104, the customer node 104 will perceive itself to only be communicating with the first support node 108 (i.e., a single bottom tier support representative operating the first support node 108 who will frequently have special language and/or interpersonal skills training). However, unbeknownst to the customer node 104, the technical issue(s) faced by the customer node 104 may be stepwise escalated to one or more higher-tier support representatives each having greater knowledge, experience, and/or specialization than the last. As all collaboration that occurs between those support representatives and all instructions sent to the processor of the customer node 104 may be cloaked (i.e., appear to the customer node 104 to be originating from the first support node 108), the customer node 104 further perceives that the single bottom tier support representative that operates the first support node 108 is highly skilled and capable of solving any problem.

In addition, the present invention frees up resources at the support provider and allows those resources to be allocated optimally. More specifically, the present invention enables higher-tier support representatives to work on multiple issues in parallel and to concentrate on problem solving, not customer interaction. Moreover, the present invention permits for real-time oversight by allowing supervisors and managers to monitor their representatives for quality assurance during the online support session; the supervisors and managers need not wait for a recording or a transcript of the support session to become available. Thus, steps for improving a support representative's performance may be more quickly identified and implemented. Of course, the present invention still also permits for the dialog that occurred during the online support session to be archived and later reviewed. It may be reviewed, for example, to ascertain whether technical issue(s) faced by the customer node 104 were escalated to higher-tier support representatives at the appropriate times and, as such, to determine whether the resources (e.g., the support nodes) in the system 100 are being optimally allocated.

It should also be noted that embodiments of the present invention may be provided as one or more computer-readable programs embodied on or in one or more articles of manufacture. The article of manufacture may be a floppy disk, a hard disk, a CD ROM, a flash memory card, a PROM, a RAM, a ROM, or a magnetic tape. In general, the computer-readable programs may be implemented in any programming language. Some examples of languages that can be used include C, C++, or JAVA. The software programs may be stored on or in one or more articles of manufacture as object code.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method of providing online collaborative support to a customer node over a computer network, the method comprising:
   establishing an online support session facilitating, at least in part, bi-directional communication of support session information between a customer node and a first support node, the support session information being related to resolution of an issue relating to a computer or computer program that is faced by the customer node;
   connecting, in response to a lack of resolution of the issue, a third node to the online support session, the connection being made without notice thereof being provided to the customer node;
   communicating bi-directionally between the first support node and the third node in a collaborative effort to resolve the issue faced by the customer node;
   transmitting additional support session information from the third node to an intermediate node different from the customer node, the first support node, and the third node;
   reconfiguring, at the intermediate node, the additional support information in such a fashion that the reconfigured additional support session information appears to the customer node to have been transmitted from the first support node; and
   transmitting the reconfigured additional support information from the intermediate node to the customer node, wherein the intermediate node is connected with the first support node and the third node via a first network, and wherein the intermediate node is connected with the customer node via a second network different from the first network.

2. The method of claim 1, further comprising providing, by the first support node to the third node, session co-ordinates for the online support session, the third node being connected to the online support session using the session co-ordinates.

3. The method of claim 1, further comprising notifying the customer node of the connection from the third node to the online support session.

4. The method of claim 1, further comprising distinguishing, by the customer node, between the support session information transmitted thereto from the first support node and the support session information transmitted thereto from the third node.

5. A method of providing online collaborative support to a customer node over a computer network, the method comprising:
- establishing an online support session facilitating, at least in part, bi-directional communication of support session information between a customer node and a first support node, the support session information being related to resolution of an issue relating to a computer or computer program that is faced by the customer node;
- connecting, in response to a lack of resolution of the issue, a third node to the online support session;
- communicating bi-directionally between the first support node and the third node in a collaborative effort to resolve the issue faced by the customer node;
- transmitting additional support session information from the third node to an intermediate node different from the customer node, the first support node, and the third node, wherein the third node is assigned a control privilege over the first support node such that the customer node gives priority to processing the support session information transmitted thereto from the third node over the support session information transmitted thereto from the first support node;
- reconfiguring, at the intermediate node, the additional support information in such a fashion that the reconfigured additional support session information appears to the customer node to have been transmitted from the first support node; and
- transmitting the reconfigured additional support information from the intermediate node to the customer node, wherein the intermediate node is connected with the first support node and the third node via a first network, and wherein the intermediate node is connected with the customer node via a second network different from the first network.

6. The method of claim 5, wherein the customer node transmits the support session information to the intermediate node without knowledge that the support session information is being transmitted to the third node.

7. The method of claim 1, wherein the bi-directional communication between the first support node and the third node occurs without notice thereof to the customer node.

8. The method of claim 1, further comprising connecting a fourth node to the online support session.

9. The method of claim 8, further comprising providing session co-ordinates for the online support session to the fourth node, the fourth node being connected to the online support session using the session co-ordinates.

10. The method of claim 8, further comprising receiving, at the fourth node, support session information from the customer node.

11. The method of claim 8, further comprising transmitting information from the fourth node to the customer node.

12. The method of claim 8, further comprising communicating information among the first support node, the third node, and the fourth node.

13. The method of claim 8, wherein the fourth node monitors the support session information communicated between the customer node and the first support node without notice of said monitoring being provided to the customer node or to the first support node.

14. The method of claim 8, further comprising selecting, by the fourth node, the online support session to which the fourth node desires to connect.

15. The method of claim 8, wherein the fourth node is connected to the online support session without notice of said connection being provided to the customer node or to the first support node.

16. The method of claim 8, further comprising monitoring, by the fourth node, information communicated between the first support node and one or more additional support nodes without notice thereof to the first support node or to the one or more additional support nodes.

17. A system for providing online collaborative support to a customer node computing device over a computer network, the system comprising:
- a first support node computing device configured to connect to an online support session with a customer node computing device and to bi-directionally communicate support session information with the customer node, the support session information being related to resolution of an issue relating to a computer or computer program that is faced by the customer node;
- a third node computing device configured to connect, without notice thereof being provided to the customer node, to the online support session in response to a lack of resolution of the issue, to bi-directionally communicate with the first support node in a collaborative effort to resolve the issue faced by the customer node, and to transmit additional support session information to an intermediate node computing device different from the customer node computing device, the first support node computing device, and the third node computing device; and
- the intermediate node computing device configured to reconfigure the additional support information in such a fashion that the reconfigured additional support session information appears to the customer node to have been transmitted from the first support node and to transmit the reconfigured additional support information to the customer node, wherein the intermediate node is connected with the first support node and the third node via a first network, and wherein the intermediate node is connected with the customer node via a second network different from the first network.

18. The system of claim 17, wherein the first support node is further configured to provide session co-ordinates for the online support session to the third node to facilitate connection of the third node to the online support session using the session co-ordinates.

19. The system of claim 17, further comprising the customer node, the customer node configured to distinguish between the support session information transmitted thereto from the first support node and the support session information transmitted thereto from the third node.

20. A system for providing online collaborative support to a customer node computing device over a computer network, the system comprising:
- a first support node computing device configured to connect to an online support session with a customer node computing device and to bi-directionally communicate support session information with the customer node, the support session information being related to resolution of an issue relating to a computer or computer program that is faced by the customer node;
- a third node computing device configured to connect to the online support session in response to a lack of resolution of the issue, to bi-directionally communicate with the first support node in a collaborative effort to resolve the issue faced by the customer node, and to transmit additional support session information to an intermediate node computing device different from the customer node computing device, the first support node computing device, and the third node computing device, wherein the third node is assigned a control privilege over the first support node such that the customer node gives priority to processing the support session information transmitted thereto from the third node over the support session information transmitted thereto from the first support node; and the intermediate node computing device configured to reconfigure the additional support information in such a fashion that the reconfigured additional support session information appears to the customer node to have been transmitted from the first support node and to transmit the reconfigured additional support information to the customer node, wherein the intermediate node is connected with the first support node and the third node via a first network, and wherein the intermediate node is connected with the customer node via a second network different from the first network.

21. The system of claim 17, further comprising the customer node, the customer node configured to transmit the support session information to the intermediate node without knowledge that the intermediate node is configured to transmit the support session information to the third node.

22. The system of claim 17, wherein the first support node and the third node are each configured to communicate bi-directionally between themselves without notice thereof to the customer node.

23. The system of claim 17, further comprising a fourth node computing device configured to receive session co-ordinates for the online support session.

24. The system of claim 23, wherein the fourth node is further configured to use the session co-ordinates to connect to the online support session.

25. The system of claim 24, wherein the fourth node is further configured to receive support session information from the customer node.

26. The system of claim 24, wherein the fourth node is further configured to transmit information to the customer node.

27. The system of claim 24, wherein the first support node, the third node, and the fourth node are each further configured to communicate information among themselves.

28. The system of claim 24, wherein the fourth node is further configured to monitor the support session information communicated between the customer node and the first support node without notice of said monitoring being provided to the customer node or to the first support node.

29. The system of claim 24, wherein the fourth node is further configured to select the online support session to which the fourth node desires to connect.

30. The system of claim 24, wherein the fourth node is further configured to connect to the online support session without notice of said connection being provided to the customer node or to the first support node.

31. The system of claim 24, wherein the fourth node is further configured to monitor information communicated between the first support node and one or more additional support nodes without notice thereof to the first support node or to the one or more additional support nodes.

* * * * *